(12) United States Patent
Alava et al.

(10) Patent No.: US 12,020,677 B1
(45) Date of Patent: Jun. 25, 2024

(54) CONFIDENTIAL AUDIO PROTECTION SYSTEM

(71) Applicant: United Services Automobile Association (USAA), San Antonio, TX (US)

(72) Inventors: Galo M. Alava, Tampa, FL (US); Amanda Michelle Boyd, Denver, CO (US); Ramsey Devereaux, San Antonio, TX (US); Gregory Mark Lamontagne, Helotes, TX (US); Elizabeth J. Rubin, San Antonio, TX (US); Brian Tougas, Spring Branch, TX (US); Courtney St. Martin, Forney, TX (US); Michael Kyne, Saint Petersburg, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 47 days.

(21) Appl. No.: 17/724,174

(22) Filed: Apr. 19, 2022

Related U.S. Application Data

(60) Provisional application No. 63/176,576, filed on Apr. 19, 2021.

(51) Int. Cl.
| | |
|---|---|
| *H04R 3/02* | (2006.01) |
| *G10K 11/175* | (2006.01) |
| *G10K 11/178* | (2006.01) |
| *G10L 25/78* | (2013.01) |
| *H04M 1/19* | (2006.01) |
| *A61F 11/06* | (2006.01) |

(52) U.S. Cl.
CPC .... *G10K 11/1754* (2020.05); *G10K 11/17823* (2018.01); *G10L 25/78* (2013.01); *H04M 1/19* (2013.01)

(58) Field of Classification Search
CPC .......... G10K 11/1754; G10K 11/17823; G10L 25/78; H04M 1/19
USPC .................................................. 381/73.1, 72
See application file for complete search history.

(56) References Cited

U.S. PATENT DOCUMENTS

| | | | |
|---|---|---|---|
| 10,418,019 B1 * | 9/2019 | Murad | G10K 11/1754 |
| 2011/0093262 A1 * | 4/2011 | Wittke | G10K 11/17857 704/226 |
| 2021/0091969 A1 * | 3/2021 | Bender | G06F 21/32 |
| 2022/0130372 A1 * | 4/2022 | Obaidi | G06F 21/6254 |

FOREIGN PATENT DOCUMENTS

| | | | | |
|---|---|---|---|---|
| WO | WO-2021127174 A1 * | 6/2021 | | G06F 21/6245 |

* cited by examiner

*Primary Examiner* — Ammar T Hamid
(74) *Attorney, Agent, or Firm* — Fletcher Yoder, P.C.

(57) ABSTRACT

An audio modification system includes one or more processors configured to receive audio data indicative of communication of a user while the user is positioned in a first portion of a control area, determine that the communication of the user is confidential based on the audio data, determine generated audio data configured to render the communication of the user at least partially inaudible in a second portion of the control area, and output a control signal indicative of instructions to provide the generated audio data.

19 Claims, 2 Drawing Sheets

CONFIDENTIAL AUDIO PROTECTION SYSTEM

CROSS-REFERENCE TO RELATED APPLICATION

This application claims priority to and the benefit of U.S. Provisional Application No. 63/176,576, entitled "CONFIDENTIAL AUDIO PROTECTION SYSTEM," filed Apr. 19, 2021, which is hereby incorporated by reference in its entirety for all purposes.

BACKGROUND

Verbal communication, such as verbal communication from a person via a mobile device and/or directly to another person, may include confidential information that the person may wish to keep private. Such confidential information may include personal information, financial information, and/or legal information related to the person, for example. The person may be in an area in which other people may be able to overhear the person speaking about the confidential information. In some cases, the person may be unaware of the other people. Additionally, certain recording devices, such as mobile devices and/or other audio recording devices, may be able to record the person's communication.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an audio modification system includes one or more processors configured to receive audio data indicative of communication of a user while the user is positioned in a first portion of a control area, determine that the communication of the user is confidential based on the audio data, determine generated audio data configured to render the communication of the user at least partially inaudible in a second portion of the control area, and output a control signal indicative of instructions to provide the generated audio data.

In certain embodiments, an audio modification system includes a microphone configured to receive communication of a user within a mask worn by the user and an audio modification device configured to render the communication of the user at least partially inaudible outside the mask. The audio modification device is configured to be coupled to the mask.

In certain embodiments, an audio modification system includes one or more processors configured to receive audio data indicative of communication of a first user while the first user is positioned in a first portion of a control area and receive an indication of a second user positioned in a second portion of the control area. The one or more processors are configured to determine generated audio data configured to render the communication of the first user at least partially inaudible in the second portion of the control area in response to receiving the indication of the second user positioned in the second portion of the control area and output a control signal indicative of instructions to provide the generated audio data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
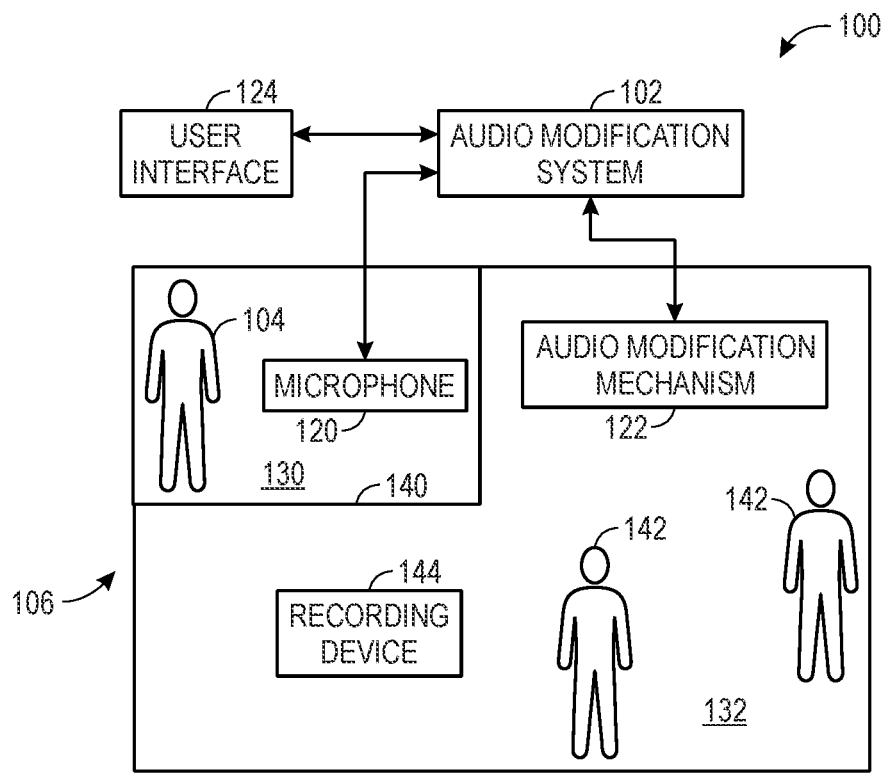
FIG. 1 illustrates a block diagram of an audio protection system including an audio modification system configured to render communication of a user at least partially inaudible, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to an audio protection system that renders communication of a user at least partially inaudible. More specifically, the audio protection system may affect the communication (e.g., verbal output; speech) of the user in a control area, such that other people cannot clearly hear the communication of the user and/or recording devices cannot clearly record the communication of the user. For example, the user may be positioned in a first portion of the control area, and the other people and/or recording devices may be positioned in a second portion of the control area. The audio modification system may receive audio data indicative of the communication of the user while the user is positioned in the first portion of the control area and may determine that the communication is confidential (e.g., private, classified, personal, financial). The audio modification system may determine generated audio data that renders the communication of the user at least partially inaudible in the second portion of the control area, such that the other people and/or the recording devices cannot determine the confidential information in the communication, for example. The audio modification system may output a control signal indicative of instructions to provide the generated audio data. Accordingly, the audio protection system described herein may render the communication of the user at least partially inaudible in the second portion of the control area to protect the user and/or others affected by the communication of the user, such as the user's family and/or the user's employer.

In certain embodiments, the audio protection system may include a microphone that detects and/or receives the communication of the user. For example, the microphone may be in a communication device of the user (e.g., a mobile device, a desktop computer, a microphone communicatively coupled to the mobile device or desktop computer). The audio protection system may also include an audio modification mechanism (e.g., a device, a speaker, a filter) that provides the generated audio data in the second portion of the control area.

In certain embodiments, the control area may be an interior portion of a structure, such as a room in a building, adjacent rooms in the building, an open area within the building (e.g., a common area, a cafeteria, a lobby). In some embodiments, the control area may be outside, such as in a park and/or adjacent to a building (e.g., in a parking lot, in a rest area, at an entrance and/or exit of the building). The control area may also be partially inside a structure and partially outside the structure. In certain embodiments, the control area may be in or adjacent to a vehicle (e.g., a car, a truck, a commercial vehicle, a bus), an aquatic vehicle (e.g., a boat, a ship), an airplane, and/or a train.

In certain embodiments, the control area may be adjacent to (e.g., in proximity of) a mask and/or another item (e.g., a helmet, a hat, a shirt, a coat) worn by the user. For example, the first portion of the control area in which the communication of the user is received may generally be between the user's face and the mask, and the second portion of the control area may be exterior to the mask. The audio modification mechanism may be an active filter exterior to the mask (e.g., on or adjacent to a front of the mask in the second portion of the control area) that provides the generated audio data to render the communication of the user at least partially inaudible in the second portion of the control area. Additionally or alternatively, the audio modification mechanism may be a passive filter that renders the communication of the user at least partially inaudible. For example, the passive filter may be a physical component on or adjacent to the front of the mask in the second portion of the control area that affects the communication of the user in the second portion of the control area. In some embodiments, the audio protection system may include the microphone in the first portion of the control area and/or the audio modification mechanism in the second portion of the control area. The microphone and the audio modification mechanism may be coupled to one another and attached to the mask, such as via a fastener (e.g., a clip, a pin, a snap mechanism). In certain embodiments, the microphone and/or the audio modification mechanism may be integrally formed with the mask. In some embodiments, the microphone and/or the audio modification mechanism may be coupled to a headset worn by the user. In certain embodiments, the audio modification mechanism may be disposed apart from the user. For example, the audio modification mechanism may be a noise-canceling device disposed within and/or adjacent to the control area that is configured to provide noise to at least partially render the user's communication inaudible.

With the foregoing in mind, FIG. 1 illustrates a block diagram of an audio protection system 100 including an audio modification system 102 configured to render communication of a user 104 at least partially inaudible in a control area 106. The audio protection system 100 includes a microphone 120, an audio modification mechanism 122, and a user interface 124, each of which may be communicatively coupled (e.g., via a wired connection, via a wireless connection) to the audio modification system 102. In certain embodiments, the microphone 120, the audio modification mechanism 122, and/or the user interface 124 may be omitted from the audio protection system 100. The microphone 120 may be positioned in a first portion 130 of the control area 106, and the audio modification mechanism 122 may be positioned in a second portion 132 of the control area 106. As illustrated, the control area 106 is a room including a partition 140 (e.g., a real or an imaginary wall) generally distinguishing the first portion 130 from the second portion 132. In other embodiments, the control area 106 may include adjacent rooms in a building, an open area within the building, may be outside the building, in or adjacent to a vehicle, in or adjacent to a train, in or adjacent to an aquatic vehicle (e.g., a boat), or another suitable area where protection of the communication of the user 104 may be beneficial. In some embodiments, the audio protection system 100 may include the first portion 130 and/or the second portion 132 of the control area 106.

The audio modification system 102 may receive audio data indicative of the communication of the user 104 from the microphone 120 and/or another suitable audio detection and transmission device. For example, the microphone 120 may be configured to detect, record, and/or transmit the communication provided by the user 104 upon detecting the communication, based on a user input (e.g., the user 104 or another user activating the audio protection system 100), based on a pre-defined schedule (e.g., certain hours of each day, certain days of each week, a specific time period), upon detecting a presence of people 142 (e.g., additional users) and/or a recording device 144 (e.g., an audio device) in the second portion 132 of the control area 106, and/or based on other detections. In some embodiments, the microphone 120 may continuously detect and transmit the communication of the user 104.

In response to receiving the communication of the user 104, the audio modification system 102 may determine whether the communication is confidential. As used herein, the term "confidential" may refer to personal, financial, and/or legal information of the user 104, the user's family, and/or the user's employer. In some embodiments, the communication may be confidential if it includes classified information (e.g., at a confidential security level, at a secret security level, at a top secret security level). The audio modification system 102 may determine that the communication includes confidential information based on keywords within the communication, such as keywords identifying any of the examples of confidential information listed above (e.g., a name of the user 104, a bank account number, an account balance, an address, information related to a classified government program). In certain embodiments, the audio modification system 102 may identify the keywords that indicate the confidential nature of the communication based on information related to the user 104, such as information in a user profile stored in a user profile database and that indicates known information about the user 104 (e.g., personal information, financial information). In some embodiments, the audio modification system 102 may identify the keywords that indicate the confidential nature of the communication based on information related to a classified government program, such as information stored in a classified government program database and that indicates known information about classified government programs. The audio modification system 102 may identify the keywords prior to or while receiving the communication of the user 104 and then determine whether those keywords are present in the communication of the user 104. The user 104 may also provide inputs of the keywords that should be considered confidential (e.g., the user 104 may set a preference for the keywords), such as via the user interface 124.

In certain embodiments, the audio modification system 102 may receive a user input indicating that the user 104 is about to provide communication including confidential information. For example, the user 104 may provide an input via the user interface 124 indicative of instructions to consider the communication of the user 104 to be confidential and/or to begin rendering the communication of the user 104 at least partially inaudible in the second portion 132 of the control area 106 (e.g., blocking the communication in the second portion 132 of the control area 106). In some embodiments, the user interface 124 may provide selectable options (e.g., text fields, dropdown menus, selectable icons) allowing the user 104 to input a schedule for rendering the communication at least partially inaudible, such as certain hours of the day, certain days of the week, or another predetermined time period during which the communication should be rendered at least partially inaudible.

In certain embodiments, the audio modification system 102 may determine that the communication of the user 104 is confidential based on an identifier associated with and/or carried by the user 104, such as an identifier associated with a mobile device of the user 104 (e.g., a mobile device that the user 104 is using to communicate, a mobile device that includes the audio modification system 102, the microphone 120, and/or the user interface 124). The identifier may include a card or device having a radiofrequency identification (RFID) tag or other code (e.g., bar code, Quick Response (QR) code) that is readable by a reader in the control area 160 or a username/account associated with the user 104 that the user 104 may provide an input at the user interface 124 prior to the communication by the user 104, for example. In some embodiments, the audio modification system 102 may determine that the communication of the user 104 is confidential based on a tone, a volume, a pitch, and/or an inflection in the communication of the user 104. For example, if the communication becomes quieter (e.g., if a change in volume of the communication exceeds a threshold volume change) and/or if the pitch changes dramatically (e.g., a change in the pitch of the communication exceeds a threshold pitch change), the audio modification system 102 may determine that the communication is more likely to include confidential information or includes confidential information.

In certain embodiments, the communication of the user 104 may include communication of another party communicating with the user 104. For example, if the user 104 is communicating via a mobile device or other communication mechanism and a volume of the communication of the other party is relatively loud (e.g., a speakerphone setting of the mobile device is turned on), the communication of the other party may be audible in the second portion 132 of the control area 106. Accordingly, the audio modification system 102 may render the communication of the user 104 that includes the communication of the other party at least partially inaudible in the second portion 132.

In response to determining that the communication of the user 104 includes confidential information, the audio modification system 102 may determine generated audio data (e.g., generated sound; active noise-cancelling audio data or voice-cancelling audio data) that renders the communication at least partially inaudible in the second portion 132 of the control area 106. The audio modification system 102 may determine the generated audio data based on parameters, such as a frequency and/or an amplitude, of sound waves of the communication of the user 104. For example, the generated audio data may include another frequency and/or another amplitude of sound waves that is generally opposite or otherwise configured to cancel or at least partially cancel the sound waves of the communication of the user 104. More specifically, the frequency and amplitude of the generated audio data may be 180 degrees out of phase relative to the frequency and amplitude of the communication of the user 104 (e.g., a phase shift of 180 degrees). In other embodiments, a phase shift between the communication of the user 104 and the generated audio data may be between 0 degrees and 180 degrees.

Additionally or alternatively, the generated audio data may be indicative of audio at a particular volume that renders the communication of the user 104 at least partially inaudible in the second portion 132 of the control area 106. For example, the generated audio may be loud enough to render the communication at least partially inaudible. The audio modification system 102 may determine the volume of the generated audio data based on a volume of the communication of the user 104, to be proportional to the volume of the communication of the user 104, and/or to be a percentage (e.g., ten percent, twenty percent, fifty percent, one hundred percent, one hundred ten percent, one hundred fifty percent, two hundred percent, five hundred percent) of the volume of the communication of the user 104.

In certain embodiments, the audio modification system 102 may determine whether a probability that the communication of the user 104 includes confidential information exceeds a threshold probability, and in response to the probability exceeding the threshold probability, determine the generated audio data for output via the audio modification mechanism 122. For example, the audio modification system 102 may determine the probability that the communication of the user 104 includes confidential information based on a number and/or a type of the keywords described above being in the communication, a percentage of the communication being the keywords, and other suitable factors. The audio modification system 102 may determine the threshold probability based on inputs received from the user 104 (which may include the identifier associated with the user 104), inputs received from another party (e.g., an employer and/or family member of the user 104), a type (e.g., personal, financial, classified) of the keywords identified in the communication, a type of the control area 106, and other suitable factors. Such inputs may be received via the user interface 124.

The audio modification system 102 may output a control signal indicative of instructions to provide the generated audio data. For example, the audio modification system 102 may output the control signal to the audio modification mechanism 122. In response, the audio modification mechanism 122 may generate audio based on the control signal and generated audio data. For example, the audio modification mechanism 122 may include one or more speakers that generate the audio to render the communication of the user 104 at least partially inaudible in the second portion 132 of the control area 106. As described in greater below in reference to FIG. 3, the audio modification mechanism 122 may include an active filter that produces the generated audio and/or a passive filter that does not produce generated audio. As illustrated, the audio modification mechanism 122 is positioned in the second portion 132 of the control area 106. In other embodiments, the audio modification mechanism 122 may be positioned at least partially in the first portion 130 of the control area 106 and/or outside the control area 106. It should be appreciated that the audio modification mechanism 122 may be carried by the one or more other people 142 (e.g., speakers of mobile devices of the one or more other people 142) in the second portion 132 of the control area 106.

In certain embodiments, the audio modification system 102 may determine that the one or more people 142 and/or the one or more recording devices 144 are present in the control area 106 (e.g., in the second portion 132 of the control area 106) and, in response, determine whether the communication of the user 104 includes confidential information and/or determine/provide the generated audio data in the control area 106. For example, the audio modification system 102 may receive indication(s) from sensor(s) that detect the presence of the people 142 and/or the presence of the recording device 144. In some embodiments, the audio protection system 100 may include such sensors, which may include cameras, infrared sensors, pressure sensors, thermometers, devices of the people 142, and other sensors that may detect the people 142 and/or the recording device 144. For example, the audio modification system 102 may receive image(s) from camera(s), motion indication(s) from infrared sensor(s), pressure reading(s) from pressure sensor(s), temperature reading(s) from thermometer(s), indication(s) of wireless communication with device(s) of the users 142 (e.g., mobile phone, watch, RFID tag, ID card), and/or other indication(s) of the people 142 from other sensor(s). While the illustrated embodiment includes two people 142 in the second portion 132 of the control area 106, the audio modification system 102 may determine that other amounts of people are present in the second portion 132 (e.g., one person, three people, ten people, one hundred people). Additionally, while the illustrated embodiment includes one recording device 144 in the second portion 132 of the control area 106, the audio modification system 102 may determine that other amounts of recording devices are present in the second portion 132 (e.g., one recording device, three recording devices, ten recording devices, one hundred recording devices).

In certain embodiments, the audio modification system 102 may determine that the people 142 are within a threshold distance (e.g., 0.1 meters (m), 0.5 meters, 1 meter, 2 meters, 3 meters, 4 meters, 5 meters, 10 meters, 20 meters, 50 meters) from the user 104, and in response, determine whether the communication of the user 104 includes confidential information and/or determine/provide the generated audio data in the control area 106. The audio modification system 102 may determine the threshold distance based on inputs received from the user 104, inputs received from another party, a type of keywords identified in the communication of the user 104, a type of the control area 106, and other suitable factors.

The audio modification system 102 may determine and instruct output of the generated audio data only when a threshold number of people 142 are present in the control area 106, only when the threshold number of people 142 are within the threshold distance, and/or only when the confidential information is identified. However, in some cases, the audio modification system 102 may be more protective, such as by determining and instructing output of the generated audio data any time the communication of the user 104 (or another user) is detected in the control area 106 or any time the communication of the user 104 (or another user) is determined to be confidential (e.g., regardless of whether the one or more people 142 are detected in the control area 106), for example. The level of protection provided by the audio modification system 102 may vary based on a level of the confidential information, which may be indicated by the keywords, the identifier, and/or one or more inputs. For example, a communication from the user 104 who has an identifier that indicates that the user 104 works in a legal department of a business may result in the generated audio data regardless of the keywords and/or the presence of the one or more people 142, while a communication from another user who has an identifier that indicates that the user works in a sales department of the business may result in the generated audio data only when certain keywords are detected and/or in the presence of the threshold number of people 142. In certain embodiments, the audio modification system 102 may determine an identities of the people 142, such as based on the indications (e.g., information) from sensors that detect the presence of the people 142, and determine whether the generated audio data is applicable based on the identities. For example, if the people 142 and the user 104 work in a same department (e.g., legal, sales, engineering, information technology, management) of a company, the audio modification system 102 may determine that the generated audio data is not applicable (e.g., that there is no need to render potentially confidential communication of the user 104 inaudible) and not proceed with determining the generated audio data. If the people 142 and the user 104 work in different departments of a company and/or for different companies, the audio modification system 102 may determine that the generated audio data is applicable and proceed with determining the generated audio data. Thus, the factors disclosed herein may be combined and analyzed in different ways to trigger the output of the generated audio data to render the communication of the user 104 at least partially inaudible in the second portion 132 of the control area 106 at appropriate times and to provide appropriate levels of confidentiality. Once the generated audio data is triggered and/or determined, the generated audio data may be output until receipt of an input indicating that the communication of the user 104 is complete (e.g., a phone call is terminated), until a threshold time passes without any keywords that indicate confidentiality is needed, and/or until some other time or event.

In certain embodiments, the audio modification system 102 may determine the generated audio data, such that the generated audio does not interfere with a conversation and/or activities of the people 142 in the second portion 132 of the control area 106. For example, the audio modification system 102 may receive an indication that one or more of the people 142 are speaking and/or performing another activity and account for this when determining the generated audio data. More specifically, the audio modification system 102 may decrease a volume of the generated audio data in the second portion 132 of the control area 106 to facilitate a conversation and/or another activity of the people 142. In certain embodiments, the audio protection system 100 may include a microphone in or proximate to the second portion 132 of the control area 106 that receives audio produced by the people 142, and the audio modification system 102 may receive the indication of one or more of the people 142 speaking from the microphone.

In some embodiments, the audio modification system 102 may determine parameters (e.g., a position, a size) associated with the control area 106, parameters associated with the first portion 130 of the control area 106, and/or parameters associated with the second portion 132 of the control area 106, based on user inputs indicative of such parameters, a position of the user 104, positions of the people 142, a position of the recording device 144, and/or relative positions of the user 104, the people 142, and/or the recording device 144. The audio modification system 102 may determine whether to determine the generated audio data based on the parameters associated with the control area 106 and/or may determine parameters (e.g., volume, frequency, amplitude) associated with the generated audio data based on the parameters associated with the control area 106.

In some embodiments, in addition to or in place of determining that the communication of the user 104 includes confidential information, the audio protection system 100 may modify the communication of the user 104 to protect (e.g., hide) an identity of the user 104, such that the communication is still audible in the second portion 132 of the control area 106. For example, an intended audience may be able to identify the user 104, if the intended audience hears the user's unmodified voice. The user 104 may wish to remain anonymous and/or unidentified. Accordingly, the audio protection system 100 may receive the audio data indicative of the communication of the user 104, modify the audio data to generate modified audio data (e.g., generated audio data), and output a control signal indicative of instructions to generate and provide the modified audio data. The modified audio data may change a tone, pitch, volume, and/or other aspects of the voice of the user 104, thereby concealing the identity of the user 104. In some embodiments, the audio modification system 102 may determine the modification/change to the communication based on the intended audience (e.g., a customer, an employer, a reporter, a vendor), an input provided by the user 104 and/or another party, a context of the communication of the user 104 (e.g., keywords identified in the communication), and other factors. The input provided by the user 104 and/or the other party may include an identity of the intended party, an identity of the user 104, selections of parameters (e.g., a gender, an age, a language) used to generate the modified audio data, and may be provided via the user interface 124.

Figure 2:
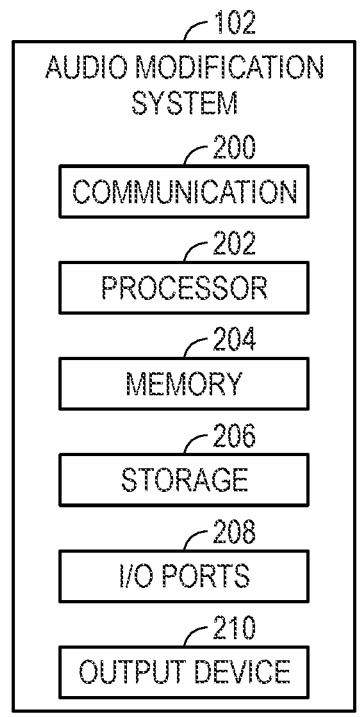
FIG. 2 illustrates a block diagram of components that may be part of the audio modification system of FIG. 1, in accordance with embodiments described herein.

The audio modification system 102 may include certain components to facilitate these actions. FIG. 2 illustrates a block diagram of components that may be part of the audio modification system 102 of FIG. 1. For example, the audio modification system 102 may include a communication component 200, a processor 202, a memory 204, a storage 206, input/output (I/O) ports 208, an output device 210 (e.g., a display or a speaker), or any of a variety of other components that enable the audio modification system 102 to carry out the techniques described herein. The communication component 200 may be a wireless or wired communication component that may facilitate communication between the audio modification system 102, the microphone 120, the audio modification mechanism 122, the user interface 124, and/or any of a variety of systems or devices (e.g., mobile devices).

The processor 202 may be any suitable type of computer processor or microprocessor capable of executing computer-executable code. The processor 202 may also include multiple processors that may perform the operations described below. The memory 204 and the storage 206 may be any suitable articles of manufacture that can serve as media to store processor-executable code, data, or the like. These articles of manufacture may represent computer-readable media (e.g., any suitable form of memory or storage) that may store the processor-executable code used by the processor 202 to perform the presently disclosed techniques. The memory 204 and the storage 206 may also be used to store the data, various other software applications, and the like. The memory 204 and the storage 206 may represent non-transitory computer-readable media (e.g., any suitable form of memory or storage) that may store the processor-executable code used by the processor 202 to perform various techniques described herein. It should be noted that non-transitory merely indicates that the media is tangible and not a signal.

The I/O ports 208 may be interfaces that may couple to other peripheral components such as input devices (e.g., keyboard, mouse), sensors, input/output (I/O) modules, and the like. The output device 210 may operate to depict indications associated with software or executable code processed by the processor 202. In one embodiment, the output device 210 may be an input device. For example, the output device 210 may include a touch display capable of receiving inputs from a user of the audio modification system 102. The output device 210 may be any suitable type of display, such as a liquid crystal display (LCD), plasma display, or an organic light emitting diode (OLED) display, for example. In one embodiment, the output device 210 may depict or otherwise provide an indication of the communication of by the user 104, the confidential information in the communication, an indication of the presence of the people 142 and/or the recording device 144, and an indication of the generated audio data. In certain embodiments, the output device 210 may include, provide, and/or display the user interface 124.

It should be noted that the components described above with regard to the audio modification system 102 are exemplary components and the audio modification system 102 may include additional or fewer components as shown. Additionally, it should be noted that the microphone 120, the audio modification mechanism 122, and/or the user interface 124 may also include similar components, or may be part of a system or a device (e.g., a mobile device) that includes similar components, as described as part of the audio modification system 102. With the foregoing in mind, additional details with regard to rendering communication of the user 104 at least partially inaudible in the control area 106 are discussed below with reference to FIGS. 3 and 4.

Figure 3:
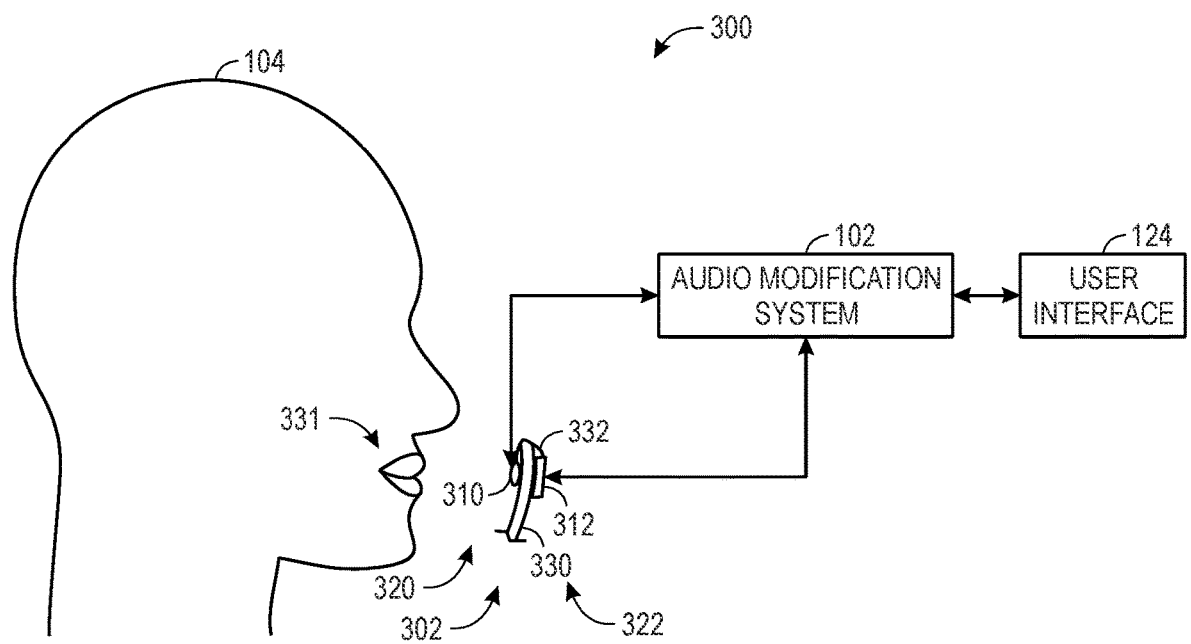
FIG. 3 illustrates a block diagram of an audio protection system including the audio modification system configured to render communication of a user at least partially inaudible, wherein the audio protection is implemented in conjunction with a mask, in accordance with embodiments described herein.

FIG. 3 illustrates a block diagram of an audio protection system 300 that may include the audio modification system 102 configured to render communication of the user 104 at least partially inaudible in a control area 302. The audio protection system 300 includes a microphone 310 and an audio modification mechanism 312 (e.g., device, speaker, filter), each of which may be communicatively coupled (e.g., via a wired connection, via a wireless connection) to the audio modification system 102. In certain embodiments, the microphone 310 and/or the audio modification mechanism 312 may be omitted from the audio protection system 300.

The microphone 310 may be positioned in a first portion 320 of the control area 302, and the audio modification mechanism 312 may be positioned in a second portion 322 of the control area 302. As illustrated, the user 104 is wearing a mask 330 that covers a mouth 331 of the user 104. Although not illustrated, the mask 330 may be secured to a head of the user 104 and/or to other portions of the user 104. The first portion 320 of the control area 302 is generally between the mask 330 and the user 104, and the second portion 322 of the control area 302 is generally exterior to the mask 330. The second portion 322 may include any area in front of and/or around the user 104 that is not between the user 104 and the mask 330. In some embodiments, the second portion 322 of the control area 302 may generally be exterior to the audio modification mechanism 312 and on an opposite side of the audio modification mechanism 312 from the mask 330. The mask 330 may be a health mask, such as a mask that protects the user 104 and/or others from contracting an illness, a safety mask, a work mask, a winter mask, or another suitable mask or article of clothing (e.g., scarf, collared jacket). In certain embodiments, the audio protection system 300 may include the mask 330. In some embodiments, the audio protection system 300 may include the first portion 320 and/or the second portion 322 of the control area 302.

The microphone 310 and the audio modification mechanism 312 may be coupled to one another via a coupling mechanism 332 (e.g., a clip, a bracket, a fastener). Additionally, the coupling mechanism 332 may be coupled to the mask 330, such that the coupling mechanism 332 may secure the microphone 310 and the audio modification mechanism 312 to the mask 330. The coupling mechanism 332 may enable the microphone 310 and the audio modification mechanism 312 to be removably coupled to the mask 330 so as to be reusable (e.g., with multiple different masks 330). In certain embodiments, the microphone 310, the audio modification mechanism 312, and/or the coupling mechanism 332 may be part of and/or integrally formed with the mask 330 (e.g., only useable with the mask 330). In some embodiments, the microphone 310 and/or the audio modification mechanism 312 may be coupled to a headset worn by the user 104. In certain embodiments, the audio modification mechanism 312 may be disposed apart from the user 104. For example, the audio modification mechanism 312 may be a noise-canceling device disposed within and/or adjacent to the control area 302 that is configured to provide noise to at least partially render the user's communication inaudible.

The audio modification system 102 may receive audio data indicative of the communication of the user 104 from the microphone 310. In some embodiments, the microphone 310 may be communicatively coupled to a mobile device of the user 104, such as a cell phone into which the user 104 is speaking. In response to receiving the communication of the user 104, the audio modification system 102 may determine whether the communication is confidential using any of the methods described herein. For example, the audio modification system 102 may determine that the communication includes confidential information based on keywords within the communication and/or based on the probability threshold. In certain embodiments, the audio modification system 102 may receive a user input indicating that the user 104 is about to provide communication including confidential information, such as via the user interface 124 and/or via another mechanism (e.g., a button, a switch) at the microphone 310, at the audio modification mechanism 312, at the mask 330, and/or at the coupling mechanism 332.

In response to determining that the communication of the user 104 includes confidential information, the audio modification system 102 may determine generated audio data that is configured to render the communication at least partially inaudible in the second portion 322 of the control area 302 (e.g., block the communication in the second portion 322 of the control area 302). The audio modification system 102 may output a control signal indicative of instructions to provide the generated audio data, such as to the audio modification mechanism 312. In response, the audio modification mechanism 312 may generate audio based on the control signal and generated audio data. For example, the audio modification mechanism 312 may include one or more speakers that generate the audio to render the communication of the user 104 at least partially inaudible in the second portion 322 of the control area 302. For example, the audio modification mechanism 312 may include an active filter (e.g., speaker(s)) that produces the generated audio to render the communication of the user 104 at least partially inaudible.

In some embodiments, the audio modification mechanism 312 may include a passive filter that modifies the communication of the user 104 as the communication (e.g., sound waves) pass through the mask 330. For example, the passive filter may include a physical component that receives the sound waves produced by the user 104 and transforms the sound waves to render the communication at least partially inaudible. The passive filter may operate independently of the audio modification system 102, such that the passive filter does not require the control signal indicative of the generated audio data to render the communication of the user 104 at least partially inaudible in the second portion 322 of the control area 302. In some embodiments, the passive filter may be actuatable so as to move between a first position in which the passive filter renders the communication at least partially inaudible and a second position in which the passive filter does not affect the communication in this way (e.g., from in front of the mask 330 to a side of the mask 330).

In certain embodiments, the audio modification system 102 may determine that the people 142, the recording device 144, and/or other items that may hear or record the communication of the user 104 are present in the second portion 322 of the control area 302 and, in response, determine whether the communication of the user 104 includes confidential information and/or determine/provide the generated audio data in the second portion 322 as disclosed herein. Indeed, any of the techniques disclosed herein (e.g., with reference to FIGS. 1 and 2) may be adapted for and utilized with the audio protection system 300.

Figure 4:
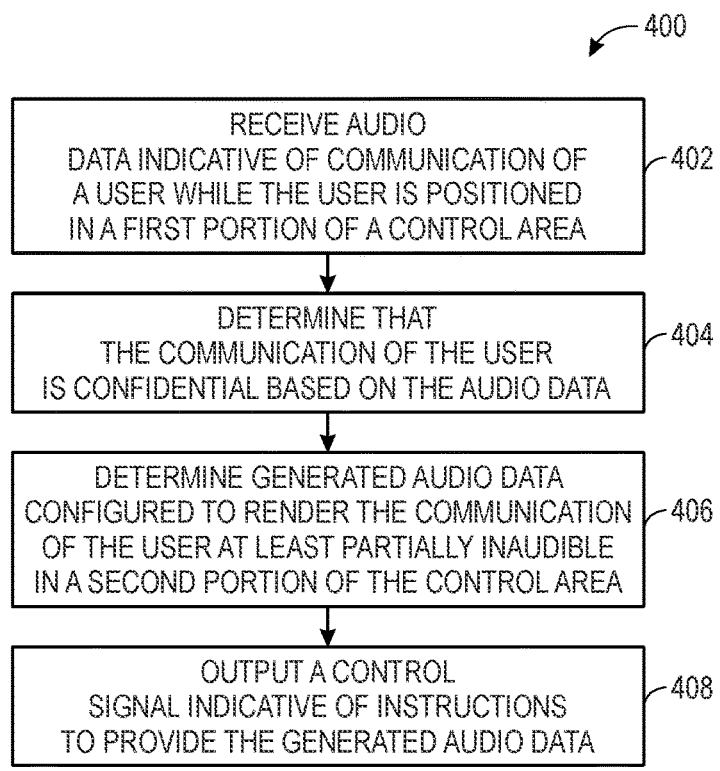
FIG. 4 illustrates a flow chart of a method for rendering communication of a user at least partially inaudible using an audio protection system, in accordance with embodiments described herein.

FIG. 4 illustrates a flow chart of a method 400 for rendering communication of a user at least partially inaudible using the audio modification system 102 of the audio protection system 100 of FIG. 1 or the audio protection system 300 of FIG. 3. The following description of the method 400 will be described as being performed by the audio modification system 102, but it should be noted that any suitable processor-based device may be specially programmed to perform any of the methods described herein. Moreover, although the following description of the method 400 is described as including certain steps performed in a particular order, it should be understood that the steps of the method 400 may be performed in any suitable order, that certain steps may be omitted, and/or that certain steps may be added.

At block 402, the audio modification system 102 may receive audio data indicative of communication of the user 104 while the user 104 is positioned in a first portion of a control area, such as in the first portion 130 of the control area 106 or in the first portion 320 of the control area 302 (e.g., the user 104 is wearing the mask 330). The audio modification system 102 may begin receiving the audio data based on an input of the user 104 and/or based on detecting that the user 104 is speaking. In some embodiments, the audio modification system 102 may instruct the microphone 120 to begin transmitting the communication of the user 104 in response to the input of the user 104 and/or detecting that the user 104 is speaking.

At block 404, the audio modification system 102 may determine that the communication of the user 104 is confidential based on the audio data received at block 402. For example, the audio modification system 102 may analyze the communication of the user 104 to identify keywords within the communication that indicate a confidential nature of the communication. As described above, the audio modification system 102 may determine which keywords to identify in the communication based on information related to the user 104, such as information in a user profile stored in a user profile database. Additionally or alternatively, as described above, the audio modification system 102 may determine a probability that the communication includes confidential information and compare the probability to a threshold probability.

At block 406, the audio modification system 102 may determine generated audio data that renders the communication of the user 104 at least partially inaudible in the control area in response to determining that the communication of the user is confidential, such as in the second portion 132 of the control area 106 or the second portion 322 of the control area 302. The generated audio data may be based on parameters of the communication of the user 104, a size and/or position of the first portion and/or the second portion of the control area, positions and/or amounts of the people and/or the recording devices in the second portion of the control area, and other factors described herein. In certain embodiments, block 404 may be omitted, and, at block 406, the audio modification system 102 may determine generated audio data that renders the communication of the user 104 at least partially inaudible in the control area 106 in response to receiving an indication that the people 142 are present in the second portion 132 of the control area 106 or the second portion 322 of the control area 302.

At block 408, the audio modification system 102 may output a control signal indicative of instructions to provide the generated audio data, such as to the audio modification mechanism 122 of FIG. 1 and/or the audio modification mechanism 312 of FIG. 3. For example, the audio modification mechanisms 122 and/or 312 may include speakers and/or other active filters that generate and provide audio based on the generated audio data. As such, the audio protection systems 100 and 300 may render the communication of the user 104 at least partially inaudible via the audio modification mechanisms 122 and 312, respectively. The audio modification system 102 may automatically and/or iteratively perform the method 400 until the communication of the user 104 is no longer determined to be confidential, based on a user input, and/or based on a time period, as discussed above.

Accordingly, the audio protection systems 100 and 300 described herein may affect the audio of the user 104 in the control areas 106 and 302, respectively, such that other people cannot clearly hear the communication of the users and/or recording devices cannot clearly record the communication of the user. For example, the audio modification system 102 may receive audio data indicative of the communication of the user 104 and determine generated audio data that renders the communication of the user 104 at least partially inaudible, such that the other people and/or the recording devices cannot determine the confidential information in the communication of the user. The audio modification system 102 may automatically and/or iteratively perform the process, thereby enabling efficient protection of the user's communication in real-time (e.g., within seconds of detecting the user's voice and/or the confidential nature of the user's communication). Accordingly, the audio protection systems 100 and 300 may render the communication of the user at least partially inaudible, or otherwise modify the communication of the user, in the control area to protect the user 104 and/or others affected by the communication of the user 104.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. It should be appreciated that any of the features shown or described with respect to FIGS. 1-4 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An audio modification system comprising:
one or more processors configured to:
receive audio data indicative of communication of a user while the user is positioned in a first portion of a control area;
determine that the communication of the user is confidential based on the audio data;
determine generated audio data configured to render the communication of the user at least partially inaudible in a second portion of the control area;
determine that the second portion of the control area has one or more additional users different than the user, one or more audio devices configured to record the communication of the user, or both; and
in response to determining that the second portion of the control area has the one or more additional users different than the user, the one or more audio devices configured to record the communication of the user, or both, output a control signal indicative of instructions to provide the generated audio data.

2. The audio modification system of claim 1, wherein determining that the communication of the user is confidential based on the audio data comprises:
determining one or more keywords indicative of personal information associated with the user, financial information associated with the user, or both; and identifying the one or more keywords in the communication of the user.

3. The audio modification system of claim 1, wherein determining that the communication of the user is confidential based on the audio data comprises:
   determining an identity of the user based on the audio data; and
   determining that the communication of the user is confidential based on the identity.

4. The audio modification system of claim 3, wherein the audio data is indicative of a name of the user.

5. The audio modification system of claim 1, wherein the generated audio data is configured to not interfere with additional communication by the one or more additional users in the second portion of the control area.

6. The audio modification system of claim 1, wherein the control area is at least partially within a building, an area outside, a vehicle, a train, or an airplane.

7. The audio modification system of claim 1, wherein the first portion of the control area comprises a first area between the user and a mask worn by the user, and the second portion of the control area comprises a second area exterior to the mask and exterior to the first area.

8. The audio modification system of claim 1, wherein determining the generated audio data configured to render the communication of the user inaudible in the second portion of the control area comprises:
   determining a frequency and an amplitude of sound waves associated with the communication of the user based on the audio data; and
   determining the generated audio data based on the frequency and the amplitude.

9. An audio modification system comprising:
   a microphone configured to receive communication of a user within a mask worn by the user; and
   an audio modification device configured to render the communication of the user at least partially inaudible outside the mask, wherein the microphone and the audio modification device are separate from the mask and configured to be coupled to the mask.

10. The audio modification system of claim 9, wherein the audio modification device is configured to produce generated audio data that renders the communication of the user at least partially inaudible outside the mask.

11. The audio modification system of claim 10, comprising one or more processors configured to:
   receive audio data indicative of the communication of the user;
   determine that the communication of the user is confidential based on the audio data;
   determine the generated audio data that renders the communication of the user at least partially inaudible outside the mask; and
   output a control signal indicative of instructions to provide the generated audio data to the audio modification device.

12. The audio modification system of claim 9, wherein the audio modification device comprises a passive filter configured to render the communication of the user at least partially inaudible outside the mask.

13. The audio modification system of claim 9, comprising a coupling mechanism configured to couple the microphone and the audio modification device to the mask.

14. The audio modification system of claim 13, wherein the coupling mechanism comprises a clip, a pin, a bracket, a fastener, or a combination thereof.

15. An audio modification system comprising:
   one or more processors configured to:
      receive audio data indicative of communication of a first user while the first user is positioned in a first portion of a control area;
      determine that a second user is positioned in a second portion of the control area;
      in response to determining that the second user is positioned in the second portion of the control area, determine generated audio data configured to render the communication of the first user at least partially inaudible in the second portion of the control area; and
      output a control signal indicative of instructions to provide the generated audio data.

16. The audio modification system of claim 15, comprising determining that the second user is positioned in the second portion of the control area based on one or more images obtained by one or more cameras, one or more motion indications obtained by one or more infrared sensors, one or more pressure readings obtained by one or more pressure sensors, one or more temperature readings obtained by one or more thermometers, or a combination thereof.

17. The audio modification system of claim 15, comprising one or more speakers, wherein the one or more processors are configured to output the control signal indicative of instructions to provide the generated audio data to the one or more speakers, and the one or more speakers are configured to generate audio configured to render the communication of the first user at least partially inaudible in the second portion of the control area in response to receiving the control signal.

18. The audio modification system of claim 15, wherein the first portion of the control area comprises a first area between the first user and a mask worn by the first user, and the second portion of the control area comprises a second area exterior to the mask and exterior to the first area.

19. The audio modification system of claim 15, wherein determining the generated audio data configured to render the communication of the first user inaudible in the second portion of the control area comprises:
   determining a frequency and an amplitude of sound waves associated with the communication of the first user based on the audio data; and
   determining the generated audio data based on the frequency and the amplitude.

\* \* \* \* \*